United States Patent

(12) United States Patent
Menard et al.

(10) Patent No.: US 6,810,526 B1
(45) Date of Patent: Oct. 26, 2004

(54) CENTRALIZED BROADCAST CHANNEL REAL-TIME SEARCH SYSTEM

(75) Inventors: Rob Menard, Nepean (CA); Paul Streatch, Richmond (CA); Roger MacLean, Nepean (CA); Jim Reed, Kanata (CA)

(73) Assignee: March Networks Corporation, Kanata (CA)

( * ) Notice: Subject to any disclaimer, the term of this patent is extended or adjusted under 35 U.S.C. 154(b) by 0 days.

(21) Appl. No.: 09/242,328

(22) PCT Filed: Aug. 14, 1997

(86) PCT No.: PCT/CA97/00571

§ 371 (c)(1),
(2), (4) Date: May 19, 1999

(87) PCT Pub. No.: WO98/07103

PCT Pub. Date: Feb. 19, 1998

(30) Foreign Application Priority Data

Aug. 14, 1996 (CA) .............................................. 2183280

(51) Int. Cl.[7] ........................... H04N 5/445; G06F 13/00
(52) U.S. Cl. ............................. 725/46; 725/32; 725/34; 725/50; 709/219
(58) Field of Search ............................. 725/46, 32, 34, 725/50, 58, 91, 114, 119, 138, 144, 109–113, 9, 14; 709/219

(56) References Cited

U.S. PATENT DOCUMENTS

| | | | | |
|---|---|---|---|---|
| 5,195,092 A | * | 3/1993 | Wilson et al. ............... | 725/146 |
| 5,410,367 A | * | 4/1995 | Zahavi et al. .................. | 725/58 |
| 5,608,446 A | * | 3/1997 | Carr et al. .................... | 725/114 |
| 5,678,170 A | * | 10/1997 | Grube et al. .................... | 725/9 |
| 5,727,129 A | * | 3/1998 | Barrett et al. .................. | 706/10 |
| 5,754,938 A | | 5/1998 | Herz et al. ..................... | 455/4.2 |
| 5,758,259 A | * | 5/1998 | Lawler .......................... | 725/45 |
| 5,761,662 A | * | 6/1998 | Dasan ........................... | 707/10 |
| 5,768,524 A | * | 6/1998 | Schmidt ........................ | 709/224 |
| 5,798,785 A | * | 8/1998 | Hendricks et al. ............ | 725/46 |
| 5,835,087 A | * | 11/1998 | Herz et al. .................... | 345/810 |
| 5,859,662 A | | 1/1999 | Cragun et al. ................. | 348/13 |
| 5,907,836 A | * | 5/1999 | Sumita et al. .................. | 707/2 |
| 5,946,665 A | * | 8/1999 | Suzuki et al. .................. | 705/26 |
| 5,959,623 A | * | 9/1999 | van Hoff et al. ............. | 345/719 |
| 5,991,735 A | * | 11/1999 | Gerace .......................... | 705/10 |
| 6,002,852 A | * | 12/1999 | Birdwell et al. ............. | 709/203 |
| 6,075,526 A | * | 6/2000 | Rothmuller .................. | 345/721 |
| 6,076,117 A | * | 6/2000 | Billings ........................ | 709/253 |
| 6,088,722 A | * | 7/2000 | Herz et al. .................... | 709/217 |
| 6,133,912 A | | 10/2000 | Montero ....................... | 345/327 |
| 6,279,029 B1 | * | 8/2001 | Sampat et al. ............... | 709/203 |
| 6,314,098 B1 | | 11/2001 | Masuda et al. ............... | 725/48 |
| 6,631,523 B1 | * | 10/2003 | Matthews et al. ............ | 725/53 |
| 6,675,386 B1 | * | 1/2004 | Hendricks et al. .......... | 725/105 |

* cited by examiner

Primary Examiner—John Miller
Assistant Examiner—Annan Q. Shang
(74) Attorney, Agent, or Firm—Marks & Clerk

(57) ABSTRACT

A system for monitoring broadcast channels, includes a device for receiving a plurality of broadcast channels, a central search engine operable to search the received channels for a match with a pre-stored profile, a central memory connected to the search engine for storing the profile, and a plurality of user terminals connected to the search engine over a network. The search engine is responsive to commands from the user terminals to store the profiles to be searched in the memory in association with the identity of the user terminal from which the command was received. A device sends an alert signal over the network when a match is found with a pre-stored profile to the user terminal associated with the pre-stored profile. The alert signal identifies the broadcast channel matching the pre-stored profile.

23 Claims, 2 Drawing Sheets

CENTRALIZED BROADCAST CHANNEL REAL-TIME SEARCH SYSTEM

Figure 1:
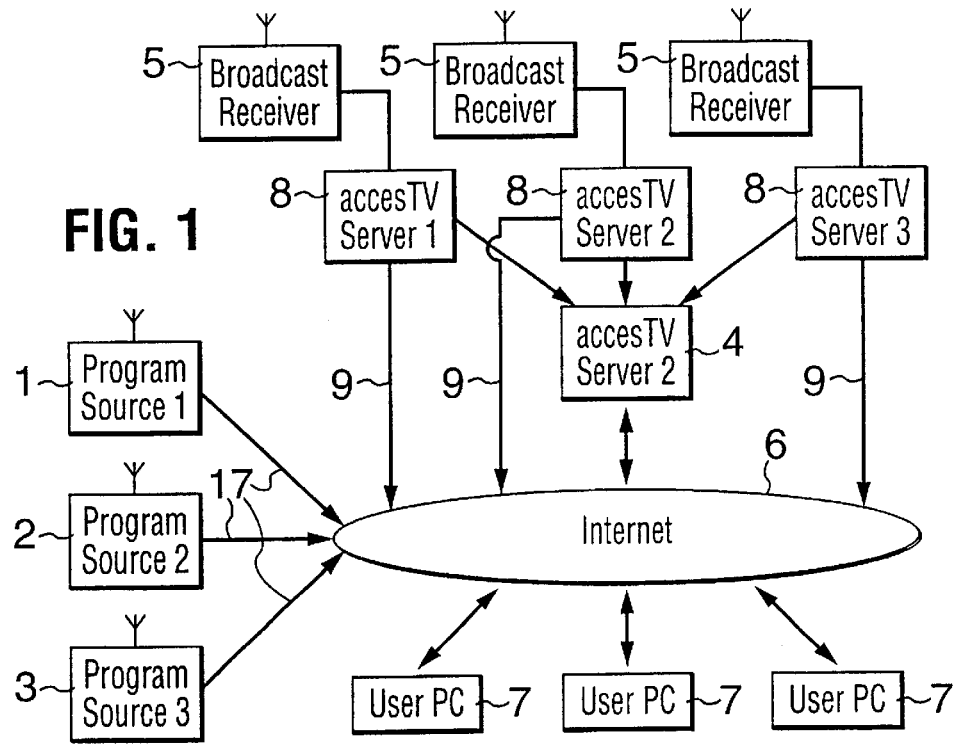

This invention relates to a system for monitoring broadcast channels, and in particular to a centralized system that permits a user to remotely query multiple broadcast channels for program content of interest.

Our co-pending application no. PCT/CA96/00131 describes an automatic broadcast monitoring system that allows a user to automatically monitor TV channels on a PC equipped with a video card. The system includes a search engine that allows the user to input selected keywords. The search engine continually monitors the closed caption stream accompanying the broadcast material to find a keyword match and identify program material of interest to the user.

While this system offers an extremely powerful search facility, it ties up resources in the user's PC on an on-going basis as it looks for a match. It also consumes considerable bandwidth to the user's location since the PC must continually receive the broadcast channels in order to monitor them.

An object of the invention is to alleviate this disadvantage.

According to the present invention there is provided a system for monitoring broadcast channels, comprising means for receiving a plurality of broadcast channels; a central search server operable to search said broadcast channels for a match with pre-stored profiles; a channel server associated with each broadcast channel for deriving therefrom a dynamically changing data stream that is representative of, and changes with, the current content of the associated broadcast channel, said channel server providing said data stream to said search server for matching with said pre-stored profiles; a memory connected to said search engine for storing said profiles; a plurality of user terminals connected to said search engine over a network, said search engine being responsive to commands from said user terminals to store said profiles in said memory in association with the identity of the user terminal from which a said command was received; and means for sending an alert signal over said network when a match is found with a said pre-stored profile to the user terminal associated with said pre-stored profile, said alert signal identifying the broadcast channel matching the pre-stored profile.

The broadcast channels will normally be television channels, although the invention is applicable to other broadcast media intended for mass distribution, such as radio channels.

The user terminals are conveniently PCs equipped with software for displaying video received in digital form. In accordance with the invention, the PCs can send instructions to the central search engine. This operation only requires a very small amount of bandwidth. The search engine then carries out the monitoring function for a large number of users, for example, on a subscription basis, and only contacts the users when a match is found.

The invention is particularly well suited for Internet applications, although it can also be used over intranets and local area networks.

Many broadcast stations are planning to multicast or unicast over the Internet, so the alert signal can include the Internet address of a program source to enable this to be connected directly to the requesting user. Alternatively, the system can supply the broadcast material to the Internet or other network through servers, in which case the alert signal will include the address of the appropriate system server.

The invention thus avoids the need to send bandwidth intensive broadcast signals to the user from the search engine, nor for the user to receive unwanted broadcast signals.

It is expected in the future that many users will receive "broadcast" channels via the Internet. Such dissemination of material, where there are a finite number of connected user is usually referred to as "multicasting", but in this specification the term "broadcasting" is used to include "multicasting". In the case of signals broadcast over the Internet, the invention has the capability of substantially reducing the amount of bandwidth consumed.

As described in our co-pending application, the pre-stored profiles are conveniently keywords that are compared to the closed caption stream associated with the broadcast signals, although other forms of pattern recognition can be used as the technology becomes available.

The invention also provides a method of monitoring broadcast channels from a central location for a plurality of distributed users, comprising the steps of receiving a plurality of broadcast channels at a central location; responding to commands over a network from distributed user terminals to store profiles specifying search criteria at said central location; deriving a dynamically changing data stream from each said broadcast channel for matching with said pre-stored profiles, said data stream being representative of, and changing with, the current content of the associated broadcast channel; continually searching said data stream for a match with said pre-stored profiles; and sending an alert signal over said network when a match is found with a said pre-stored profile to the user terminal associated with said pre-stored profile, said alert signal identifying the broadcast channel matching the pre-stored profile.

Figure 2:
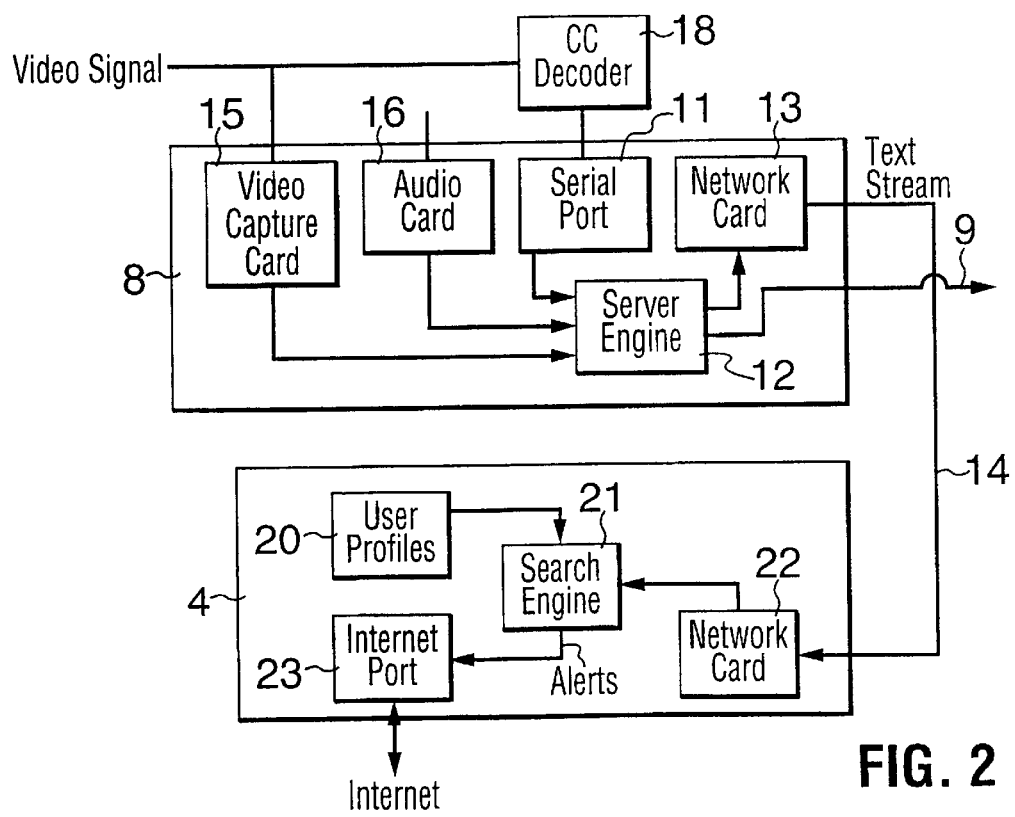
Figure 3:
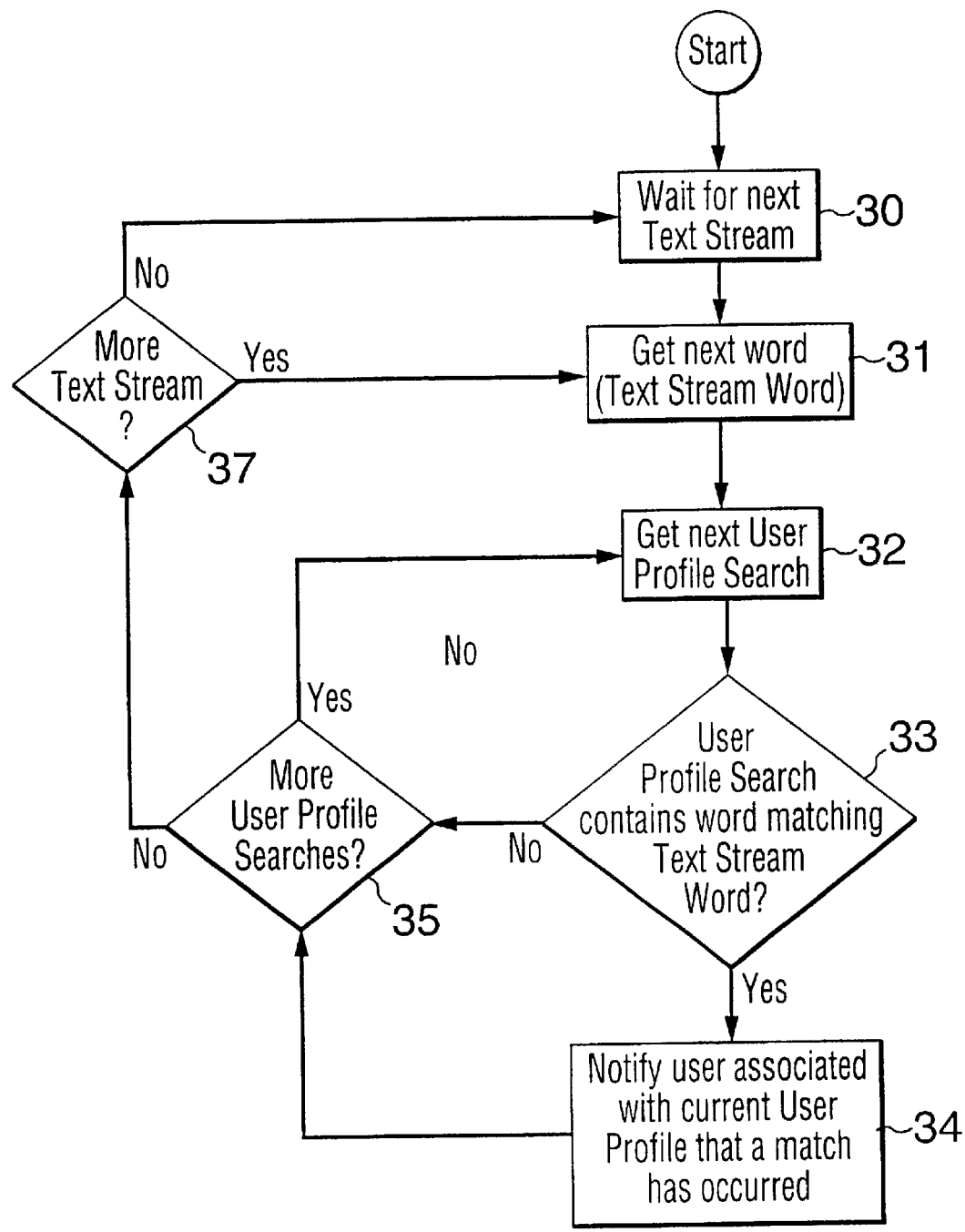

The invention will now be described in more detail, by way of example, only with reference to the accompanying drawings, in which:

FIG. 1 is a block diagram of a remote monitoring system in accordance with the invention; and FIG. 2 is a more detailed block diagram of parts of the system; and FIG. 3 is a flow chart illustrating the operation of a search server used in the remote monitoring system.

FIG. 1 shows three television stations, program source 1, program source 2, and program source 3, which broadcast television programs on pre-assigned channels in a conventional manner. Typically, a practical system will monitor 50 to 200 such channels. The program sources may be broadcasting over the airwaves, via the Internet or cable. The transmission medium employed is not relevant to the invention.

The television stations transmit a closed caption stream in line twenty-one of the vertical blanking interval in a manner known per se. The closed caption stream can be extracted with a suitable decoder to create a text stream related to the program material being broadcast at any time. The text stream was originally intended to be displayed, for example, as sub-titles on the television set of hearing impaired persons.

Our co-pending application referred to above describes a technique for monitoring the closed caption stream to identify pre-stored key words, and in the event of a match take certain actions, such as generating an alert signal or recording a current program clip for later review.

These channels are received by broadcast receivers 5 and output to channel servers 8, which digitize the video and audio signal for output as a multimedia signal 9, for example in MPEG format, and also generate a time-tagged text stream for input to search server 4. The digitized multimedia signal 9 is made available to the Internet 9.

These channels are received by broadcast receivers 5 and output to channel servers 8, which digitize the video and audio signal for output as a multimedia signal 9, for example in MPEG format, and also generate a time-tagged text stream for input to search server 4. The digitized multimedia signal 9 is made available to the Internet 9.

The use of servers 8, which can be AccessTV™ servers from Televitesse Systems Inc., frees up the search server 4 from processing the audio and video portion of the broadcast, thus allowing the search server 4 to monitor many sources. One server is provided for each monitored channel.

The broadcast receivers 5 can receive channels as direct broadcast signals, via satellite, or alternatively as broadband signals over a wide area network, such as the Internet. The broadcast signals can, for example, be transmitted in compressed format, such as MPEG.

The central search server 4 is connected via the Internet 6 to a plurality of user terminals 7, normally in the form of personal computers (PCs). The users act as clients to the search server 4. Each user can, at any time, establish a virtual connection over the Internet to the search server 4 and input a particular search profile. For example, this might be a request to search all available channels for a particular sequence of keywords. By way of example, a typical request might be to look for occurrence of the words "Clinton" and "Middle East" in a sequence of say twenty words in order to locate a clip of Bill Clinton talking about the Middle East. When a match is found, the search server 4 sends an alert signal back over the Internet to the address of the requesting PC. The user can specify that the search server is to search through all available channels or only a limited number, for example, news channels or stock market channels and the like. Such requests are stored in the user profile memory to be described below.

The alert signal is interpreted by the requesting PC 7 to take certain actions. Such actions can simply be an alert to the user that a particular station is broadcasting program material of interest, for example in the form of a dialog box displayed on the screen, showing the channel number of the program source, or alternatively, for example, activation of the appropriate channel on the user's PC 7 or television set.

Alternatively, the alert signal may include the IP address of the server 8 providing the multimedia version of the program of interest. This can be used to set up a virtual connection to the relevant server 8 so to transmit the program material directly to the user's PC 7 over the Internet. The user's PC 7 can be programmed to start recording the program material automatically on receipt of the alert signal. A clip of a user-specifiable length, say two minutes, can then stored on the user's PC for later access. To allow the user to capture program material leading up to the word match, the servers 8 can delay the transmission of the multimedia signal by a predetermined amount, for example, thirty seconds, relative to the transmission of the text stream.

In an alternative embodiment, if the identified station is multicasting over the Internet via optional links 17, the alert signal can include a message identifying the IP address of the source station and instructing the requesting user's PC to connect directly to the source station via the Internet and display the program material on the screen or store it, preferably in compressed format, for later use.

While the network 6 has been described as the Internet, it will be understood that it can be any form of network, for example, a LAN or an intranet, which is an in-house version of the Internet, i.e. a network interconnecting a plurality of LANs.

FIG. 2 is a more detailed block diagram of the system.

For each channel, a video signal, for example, from each broadcast receiver 5, via satellite or from the Internet, is passed to video capture card 15 and audio card 16 installed in a computer forming the server 8, and to closed caption decoder 18, which can be a suitable commercially available unit. The output of the decoder 18 is passed to serial port 11 of the computer 10. As indicated above, there will normally be one server for each channel.

The outputs of the video card 15, audio card 16, and serial port 11 are passed to server engine 12, which outputs the text stream onto a LAN 14, and the video and audio in multimedia format on outputs 9, for connection to the Internet 6.

The time-tagged text streams from all sources are passed over LAN 14 to central search server 4, where they are processed in a manner to be described. The text-streams include the network address, which can conveniently be in the form of an IP address, of the originating TV server 8.

The search server 4, also a computer, comprises a user profile memory 20, a search engine 21, a network card 22 for connection to LAN 14 and an Internet port 23 for connection to the Internet 6 or other network.

In operation, any user PC 7 knowing the IP address of the search server 4 can send a request over the Internet 6 to set up a particular search profile, which is stored in user profile memory 20. Such a request only requires a small amount of bandwidth since it consists merely of an instruction to the search server 4.

The search server 4 stores the profile in the memory 20 in association with the Internet address of the requesting user PC 7. The search server 4 then operates in a manner similar to that described in our co-pending application noted above until a match is found for each user profile. In this event, search engine 21 looks up in the memory 20 the address of the requesting user and sends a signal back over the Internet 6 to the appropriate user PC 7, identifying the channel where the match was found by sending the IP address of the source server 8, which accompanies the text stream on the LAN 14. This alert signal requires only a small amount of bandwidth since it does not contain program material, but merely identifying data for the program material.

The user profile memory 20 is capable of storing a large number of requests from diverse users and continually searching for matching profiles. The described system therefore lends itself particularly well to the provision of a centralized search service that accepts request from subscribers who can be billed on a usage basis.

Referring to FIG. 3, the search engine 21 starts by waiting for a text stream to arrive over LAN 14 from the servers 8 at block 30. It then extracts the next word for processing at block 31. In block 32, the search engine 21 gets the next user profile search from memory 20 and in decision unit 33, it determines whether the current user profile contains a word matching the text stream word. If yes, the search engine 21 notifies at block 34 the user PC 7 via the Internet port 23, sending a message identifying the source of the program material so that the user can view or record the material of interest.

After the current profile has been processed, the decision unit determines whether there are more profiles in the memory 20, and if yes, the block 32 extracts the next profile and the steps represented by blocks 32 and 33 are repeated as appropriate.

When all the profiles have been exhausted, the Decision unit 37 determines whether more text is available, and if so block 31 moves on to the next word.

The system has been described with reference to a single word match for convenience, although it will be understood that the system will also work using Boolean logic on any number of words occurring within a specified number of words in the same manner as our copending application referred to above. Such Boolean logic can include the usual operators such as "and", "or", "near" etc.

In the preferred implementation, when the search engine 21 reads in a user profile, it builds an index that maps all the search words to the corresponding user profiles. This allows a subset of user profiles that contain a particular search word to be searched in a single step so that a large number of user profiles can be monitored in real time.

When a match is found, the search engine can send to the user PC 7 corresponding to the current search profile, the IP address of the broadcasting channel if the channel is being directly multicast onto the Internet 6 or alternatively the IP address of the AccessTV server 9, which provides a multimedia signal 9. In one embodiment, it is envisaged that a central search service provides multicast services for broadcasters using the AccessTV servers 8.

As discussed above, the AccessTV servers 8 can include buffers for storing a specified segment of video to delay the video relative to the text stream and thereby permit the user to view a program segment preceding a word match. In the embodiment described above, the program material is stored on the user's PC. In an alternative embodiment, the search server 4 can send a signal back to the relevant TV server 8 when a match is found instructing it to store a segment of video before and after the occurrence of a matched word under a specified file name, usually in AVI format, so that when a user PC 7 responds to an alert signal from the search server 4, the user can look up the stored file representing a segment of video of interest. For example, the server 8 might store the previous 30 seconds and following 90 seconds of video around a word match in a file accessible to the user, who would then be free to download the entire file over the Internet 6 for viewing at leisure.

Because the invention is based on a centralized server concept, the search engine can be made vastly more powerful than is practical for an individual user.

The central server 4 also has the ability to collect usage statistics from a large number of users and this information can be used for targeted advertising, for example.

In another embodiment, the real-time search streams may be concatenated into one multiplexed stream with the search server 4 unpacking the concatenated streams prior to performing the search.

In yet another embodiment, the alert signal can simply be in the form of an e-mail message sent to the user's e-mail mail address. The e-mail message can identify the time and channel of the matched program, and also, if desired, by accompanied by a clip of captured text. If the embodiment is employed wherein the central service stores the clips for the user's, the e-mail message can include the filename of the stored clip so that the user can download it at his leisure even if his PC is switched off when the alert occurs.

What is claimed is:

1. A system for monitoring broadcast channels, comprising:
   a) a plurality of broadcast receivers for receiving a plurality of broadcast channels;
   b) a central search server operable to continually search incoming data streams for a match with pre-stored profiles;
   c) a charnel server associated with each broadcast channel for continually deriving therefrom a dynamically changing data stream that is representative of, and changes with, the current content of the associated broadcast channel, said channel server providing said dynamically changing data stream to said central search server for matching with said pre-stored profiles;
   d) a memory connected to said central search server for storing said profiles; and
   e) a plurality of remote user terminals connected to said central search server over a network, said central search server being responsive to commands from said user terminals to store said profiles in said memory in association with the identity of the user terminal from which a said command was received; and
   e) said central search server being programmed to send an alert signal over said network in response to said central search server finding a match with a said pre-stored profile to the remote user terminal associated with said pre-stored profile, said alert signal identifying the broadcast channel matching the pre-stored profile.

2. A system as claimed in claim 1, characterized in that said channel server extracts a closed caption text stream from the broadcast channel to provide said dynamically changing data stream to said search server.

3. A system as claimed in claim 2, wherein said channel servers also output to said network a multimedia stream containing a digitized multimedia version of said broadcast channels.

4. A system as claimed in claim 3, wherein said channel servers delay the multimedia version of the broadcast channels so as to permit the user to access a program segment immediately preceding the occurrence of a match.

5. A system as claimed in claim 3, wherein said search server contains a search engine receiving said text stream from said channel servers over a LAN.

6. A system as claimed in claim 5, wherein said search server extracts the address of the channel server associated with particular text from the originating address on the LAN and sends said address to said remote user terminal with the alert signal.

7. A system as claimed in claim 6, wherein said search engine creates an index of search words contained in said pre-stored profiles that maps said words to the pre-stored profiles in which they occur so that all the profiles containing a matched word can be searched at the same time.

8. A system as claimed in claim 1, wherein said user terminals are adapted to receive said broadcast channels directly over said network from their respective sources, and said alert signal includes the address of the source of said broadcast channels on said wide area network.

9. A system as claimed in claim 3, wherein said user terminals are adapted to receive said broadcast channels directly over said network from said channel servers in multimedia format and said alert signal includes the network address of the originating channel server.

10. A system as claimed in claim 4, wherein said user terminals comprises personal computers.

11. A system as claimed in claim 2, wherein said pre-stored profile consists of one or more keywords selected by the user and said search engine searches said closed caption text accompanying said broadcast channels to locate said one or more keywords and thereby identify program content of interest to the user.

12. A system as claimed in claim 8, wherein said network is the Internet and said address includes the IP address of said source.

13. A system as claimed in claim 1, wherein said search server instructs a said channel server to store a multimedia segment corresponding to a match for later retrieval by a user.

14. A system as claimed in claim 1, wherein said alert signal is in the form of an e-mail message to the user identifying the program source.

15. A system as claimed in claim 2, wherein said text stream is provided in time-tagged form to the search server.

16. A method of monitoring broadcast channels from a central location for a plurality of distributed users, comprising the steps of:
   a) receiving a plurality of broadcast channels at a central location;
   b) responding to commands over a network from distributed remote user terminals to store profiles specifying search criteria at said central location;
   c) continually deriving a dynamically changing data stream from each said broadcast channel for matching with said pre-stored profiles, said data stream being representative of, and changing with, the current content of the associated broadcast channel;
   d) continually searching said data stream for a match with said pre-stored profiles; and
   e) sending an alert signal over said network in response to a match with a said pre-stored profile to the user terminal associated with said pre-stored profile, said alert signal identify the broadcast channel matching the pre-stored profile.

17. A method as claimed in claim 16, wherein the pre-stored profiles contain keywords, and said keywords are compared with a closed caption text stream providing said data stream extracted from said channels.

18. A method as claimed in claim 17, wherein an index is built of al keywords in said profiles, said index mapping the keywords to the profiles containing them, whereby all the profiles containing a keyword can be searched simultaneously.

19. A method as claimed in claim 16, wherein said broadcast channel is made available on the network in multimedia format, and said alert signal contains the network address of the multimedia source of the matched channel.

20. A method as claimed in claim 19, wherein a program segment corresponding to a match is stored a the central location for later retrieval by a user.

21. A method as claimed in claim 19, wherein the multimedia output is delayed relative to the text stream to permit the user to access a program segment immediately preceding a match.

22. A method as claimed in claim 19, wherein said alert signal activates the user terminal to display automatically a matched channel.

23. A method as claimed in claim 19, wherein said alert signal is in the form of an e-mail message identifying the matched channel.

* * * * *